United States Patent
Sasaki et al.

(10) Patent No.: US 10,351,415 B2
(45) Date of Patent: Jul. 16, 2019

(54) VEHICLE SEAT AND VEHICLE SEAT MOLDING METHOD USED FOR SAME

(71) Applicant: TACHI-S CO., LTD., Tokyo (JP)

(72) Inventors: Ayaru Sasaki, Tokyo (JP); Hideki Kamata, Tokyo (JP); Yasuyuki Ito, Tokyo (JP); Ukyo Miyazawa, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 180 days.

(21) Appl. No.: 15/539,592

(22) PCT Filed: Dec. 9, 2015

(86) PCT No.: PCT/JP2015/084561
§ 371 (c)(1),
(2) Date: Jun. 23, 2017

(87) PCT Pub. No.: WO2016/104153
PCT Pub. Date: Jun. 30, 2016

(65) Prior Publication Data
US 2017/0349429 A1 Dec. 7, 2017

(30) Foreign Application Priority Data

Dec. 25, 2014 (JP) ................. 2014-262260

(51) Int. Cl.
*B68G 7/052* (2006.01)
*B60N 2/90* (2018.01)
(Continued)

(52) U.S. Cl.
CPC .............. *B68G 7/052* (2013.01); *A47C 31/02* (2013.01); *B60N 2/5875* (2013.01);
(Continued)

(58) Field of Classification Search
CPC ........ B68G 7/052; B68G 7/05; B60N 2/5891; B60N 2/5883; B60N 2/5875; B60N 2/90;
(Continued)

(56) References Cited

U.S. PATENT DOCUMENTS 5,016,941 A * 5/1991 Yokota ................. B60N 2/5875
297/452.61
5,248,356 A * 9/1993 Shimada ................. B60R 22/22
156/293
(Continued)

FOREIGN PATENT DOCUMENTS

| JP | 62-70900 U | 5/1987 |
| JP | 2-200296 A | 8/1990 |

(Continued)

OTHER PUBLICATIONS

European Search Report of EP Patent Application No. 15872722.2 dated Jun. 27, 2018 in English.
(Continued)

*Primary Examiner* — Milton Nelson, Jr.
(74) *Attorney, Agent, or Firm* — Fitch, Even, Tabin & Flannery, LLP

(57) ABSTRACT

In order to solve the issue, during recessed-shape molding for vehicle seats, of requiring a suspension step, more work, members for suspension, and increased cost in a method using suspension, a recessed-shape molding method is provided for vehicle seats having a seat frame, a seat pad covering the seat frame, and a trim cover covering the seat pad. The seat pad has a seat pad groove. An adhesive sheet is sewn on to the rear surface of the trim cover by using outer stitching, the trim cover is put on to the seat pad, then a die is pressed on to the outer stitching from the trim cover surface, the trim cover is adhered to the seat pad groove, and a recessed shape is formed. As a result, a vehicle seat having simplified molding steps and effectively reducing costs can
(Continued)

be provided, as well as a vehicle seat molding method used for same.

5 Claims, 3 Drawing Sheets

(51) Int. Cl.
| | |
|---|---|
| *A47C 31/02* | (2006.01) |
| *B68G 7/05* | (2006.01) |
| *B60N 2/58* | (2006.01) |
| *B60R 22/26* | (2006.01) |
| *B60R 22/18* | (2006.01) |

(52) U.S. Cl.
CPC ......... *B60N 2/5883* (2013.01); *B60N 2/5891* (2013.01); *B60N 2/90* (2018.02); *B60R 22/26* (2013.01); *B68G 7/05* (2013.01); *B60R 2022/1806* (2013.01)

(58) Field of Classification Search
CPC .. B60R 22/26; B60R 2022/1806; A47C 31/02
USPC .................. 297/113, 452.58, 452.61, 452.21
See application file for complete search history.

(56) References Cited

U.S. PATENT DOCUMENTS

| | | | | |
|---|---|---|---|---|
| 6,073,996 A | * | 6/2000 | Hatsuta | B60N 2/5891 297/113 |
| 2005/0081353 A1 | * | 4/2005 | Law | B60N 2/5883 29/402.11 |

FOREIGN PATENT DOCUMENTS

| | | |
|---|---|---|
| JP | H02-200296 A | 8/1990 |
| JP | H07-24159 A | 1/1995 |
| JP | 11-342279 A | 12/1999 |
| JP | 2005-58549 A | 3/2005 |

OTHER PUBLICATIONS

Office Action of JP Patent Application No. 2014-262260 dated Jul. 31, 2018 with translation.
International Search Report for PCT/JP2015/084561 dated Jan. 12, 2016; English translation submitted herewith (3 pages).
Office Action in counterpart CN Application No. 201580068709.8 dated Jan. 28, 2019 with English translation.

* cited by examiner

VEHICLE SEAT AND VEHICLE SEAT MOLDING METHOD USED FOR SAME

CROSS-REFERENCE TO RELATED APPLICATIONS

This application is a U.S. national phase application filed under 35 U.S.C. § 371 of International Application No. PCT/JP2015/084561, filed Dec. 9, 2015, designating the United States, which claims priority from Japanese Patent Application No. 2014-262260, filed Dec. 25, 2014, which are hereby incorporated herein by reference in their entirety.

TECHNICAL FIELD

The present invention relates to a vehicle seat and particularly to a vehicle seat molding method.

BACKGROUND ART

As for the vehicle seat, a front seat has been proposed, for example, a seat back of which is formed with a recessed configuration on a back side thereof such as to allow a knee space for a rear seat passenger. As for the vehicle seat formed with such a recessed portion, a molding method for making a seat cover on the seat back tightly conform to the recessed portion is disclosed in Japanese Patent Application Laid-Open No. H11(1999)-342279 (Patent Literature 1), for example. Patent Literature 1 discloses a vehicle seat in which a seat-back cushion body formed with a recess on a back side thereof is covered with a bursiform seat cover, a recess covering portion of which is pulled into the recess by means of a pull wire inserted through a suspension pouch sewn to an underside of the cover.

CITATION LIST

Patent Literature

PTL 1: Japanese Patent Application Laid-Open No. H11 (1999)-342279

SUMMARY OF INVENTION

Technical Problem

However, the vehicle seat of Patent Literature 1 requires a suspension-related step, thus taking much labor hour. Further, this vehicle seat requires suspension-related members which result in cost increase.

The invention has been accomplished in view of the above problems and has an object to provide a vehicle seat and a vehicle seat molding method used therefor which negate the need for the suspension-related step and are advantageous in cost reduction.

Solution to Problem

For achieving the above object, the invention adopts the arrangement described in the appended claims, for example. The invention includes a plurality of means for solving the above problems. To cite an example, a recessed configuration molding method for a vehicle seat including: a seat frame; a seat pad covering the seat frame; and a trim cover covering the seat pad, has an arrangement wherein the seat pad includes a seat pad groove, an adhesive sheet is sewn to an underside of the trim cover with an outer stitch, the seat pad is covered with the trim cover and then, the recessed configuration is formed by making the trim cover adhere to the seat pad groove by pressing a press die against the outer stitch from an outside surface of the trim cover.

Advantageous Effects of Invention

The invention can provide the vehicle seat and the vehicle seat molding method used therefor, which are adapted to simplify the molding process and advantageous in cost reduction.

DESCRIPTION OF EMBODIMENTS

First, an example of a conventional vehicle seat molding method which constitutes a premise of the invention is described with reference to accompanying drawings.

Figure 4:
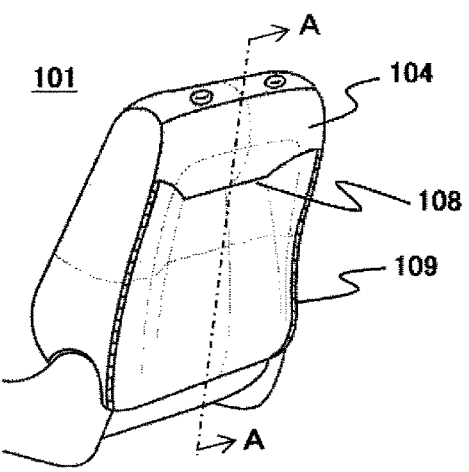
FIG. 4 is an external view of a seat back of a conventional vehicle seat.

FIG. 4 is an external view showing a seat back of a conventional vehicle seat in perspective. Referring to FIG. 4, a seat back 101 is covered with a trim cover 104 formed by sewing a sheet-like cover. In order to form a back side of the seat back in a recessed configuration, the seat back further includes an edge-stitch line 108 on which trim cover pieces are sewn together and a fastener 109.

Figure 5:
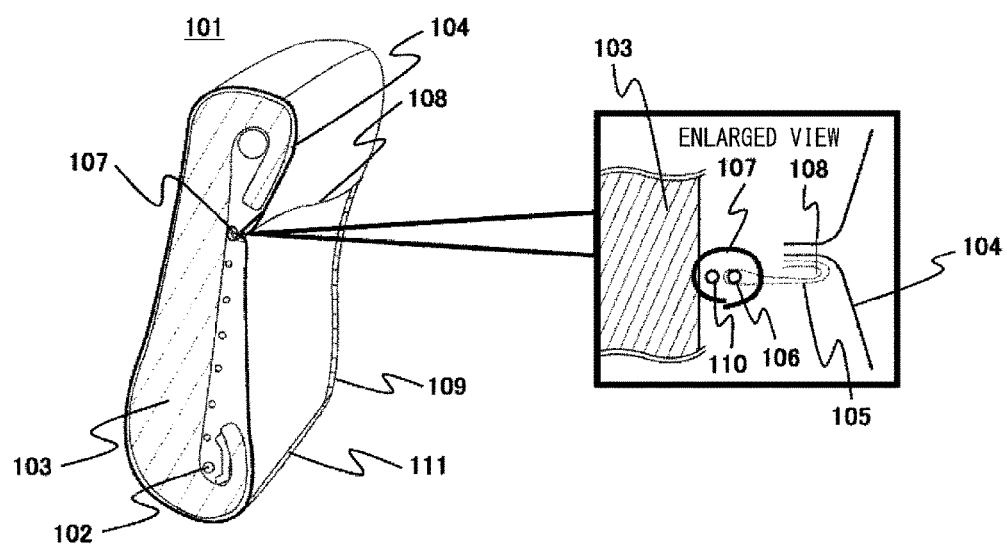
FIG. 5 is a set of diagrams illustrating a method for molding the conventional vehicle seat.

FIG. 5 is a set of diagrams illustrating a method for molding the conventional vehicle seat. The left-side diagram of FIG. 5 is a sectional view taken on the line A-A in FIG. 4. Referring to the left-side diagram of FIG. 5, a seat back frame is indicated at 102, a seat back pad indicated at 103, a trim end fastener indicated at 111, and a hook ring indicated at 107. The right-side diagram of FIG. 5 is an enlarged view of an area around the hook ring 107. Referring to the right-side diagram of FIG. 5, a suspension purse is indicated at 105, a suspension core wire indicated at 106, and a suspension wire indicated at 110.

A method for molding the back side of the conventional seat back in the recessed configuration is as follows. Referring to the right-side diagram of FIG. 5, the edge-stitch line 108 is first formed, for example, by sewing the bursiform suspension purse 105 retaining the suspension core wire 106 to a back side part of the trim cover 104 at place corresponding to a recessed configuration of the back side of the seat back. Subsequently, the trim cover 104 is put over the seat back pad 103. The trim end fastener 111 and the fastener 109 are opened so as to roll up the back side of the trim cover 104. The suspension core wire 106 is suspended in the seat back by retaining the suspension wire 110 mounted to the seat back frame 102 and the suspension core wire 106 on the hook ring 107. Thus, the edge-stitch line 108 of the trim cover 104 with the suspension purse 105 sewn thereto is drawn to the seat back frame 102 so that the trim cover 104 is formed in the recessed configuration. Thereafter, the molding process is completed by closing the fastener 109.

In this manner, the conventional method takes much labor hour, requiring the suspension-related steps which are performed after the trim cover is put over the seat back pad. Namely, the fasteners are opened and the back side of the trim cover is rolled up before the suspension task is performed. Further, the conventional method suffers cost increase, requiring suspension-related members including the suspension purse, suspension core wire, suspension wire, hook ring and the like.

Now, the embodiments for solving the above problems will be described as below with reference to the accompanying drawings.

First Embodiment

Figure 1:
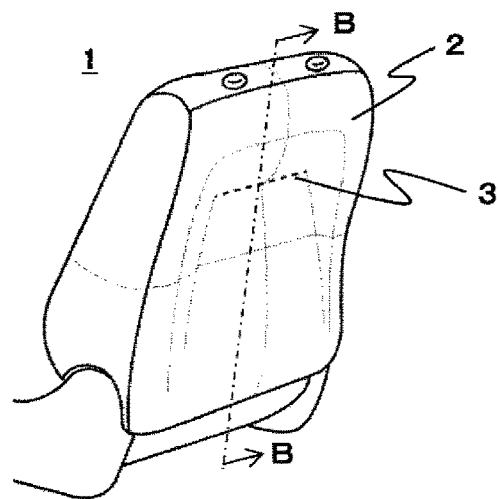
FIG. 1 is an external view of a seat back of a vehicle seat according to a first embodiment of the invention.

FIG. 1 is an external view showing, in perspective, a seat back of a vehicle seat according to a first embodiment of the invention. Referring to FIG. 1, a seat back 1 is covered with a trim cover 2 formed by sewing a sheet-like cover. In order to form a back side of the seat back in a recessed configuration, the trim cover further includes an outer stitch 3.

Figure 2:
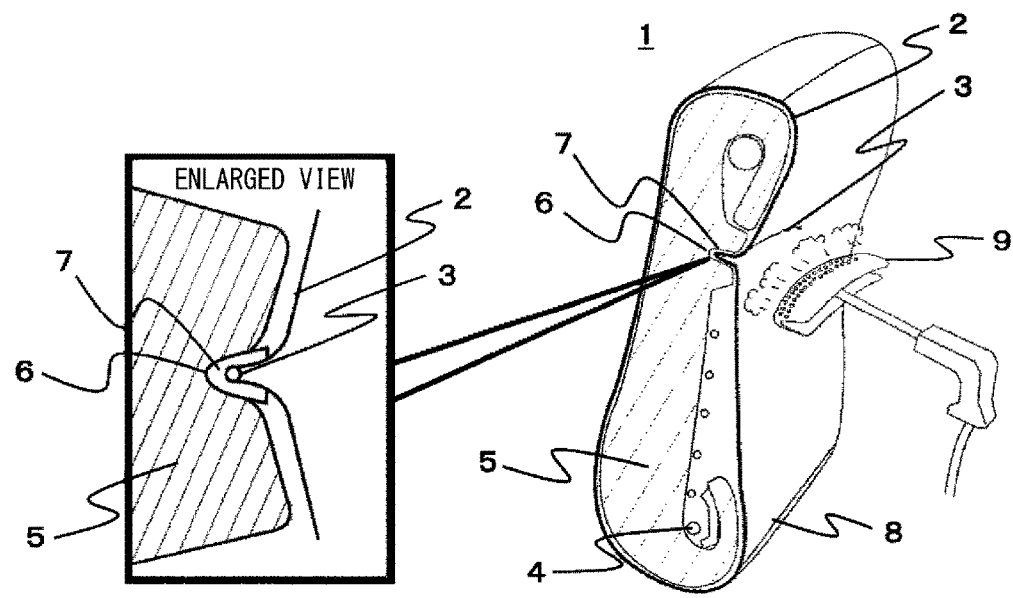
FIG. 2 is a set of diagrams illustrating a method for molding the vehicle seat according to the first embodiment hereof.

FIG. 2 is a set of diagrams illustrating a method for molding the vehicle seat according to the embodiment. The right-side diagram of FIG. 2 is a sectional view taken on the line B-B in FIG. 1. Referring to the right-side diagram of FIG. 2, a seat back frame is indicated at 4, a seat back pad indicated at 5, a seat back pad groove indicated at 6, an adhesive sheet indicated at 7, and a trim end fastener indicated at 8. The left-side diagram of FIG. 2 is an enlarged view of an area around the seat back pad groove 6.

A molding method for molding the back side of the seat back of the embodiment in the recessed configuration is described with reference to FIG. 2.

Referring to FIG. 2, the adhesive sheet 7 is sewn with the outer stitch 3 to a back side part of the trim cover 2 at an area defining the deepest portion of a recessed face produced. The seat back pad groove 6 is previously formed in the seat back pad 5 at an area defining the deepest portion of the recessed face produced.

The trim cover 2 is put over the seat back pad 5 and assembled to the seat back frame 4. The trim end fastener 8 is closed so as to establish a state where the seat back pad 5 is covered with the trim cover 2.

Subsequently, a press die 9 is aligned with the outer stitch 3 and pressed into the seat back pad groove 6 in aligned relation. At this time, the outer stitch 3 serves as a rough indication of a position where the press die 9 is pressed in. As a result, the back side part of the trim cover 2 is pulled toward the seat back pad groove 6 just like a tent, so as to form the recessed configuration. In this state, the recessed configuration is formed by melting the adhesive sheet 7 by heating a distal end of the press die 9 or ejecting steam from the distal end thereof, thus making the trim cover 2 adhere to the seat back pad groove 6 and maintain the recessed configuration. As just described, the trim cover is merely in linear contact with the seat back pad groove 6 but does not make contact with any other parts of the seat back pad. Hence, the trim cover 2 can easily form and maintain the recessed configuration. While FIG. 2 shows a hollow space between the seat back pad 5 and the trim cover 2, the hollow space may be eliminated so long as the seat back pad does not interfere with the final recessed configuration.

If the adhesive sheet can exhibit an adhesive effect without being melted, the adhesive sheet need not be melted by heat or steam. The adhesive sheet may only be pressed into the seat back pad groove by the press die as aligned with the outer stitch.

Instead of sewing the adhesive sheet to the trim cover with the outer stitch, as described above, the following method may be taken. An edge-stitch portion for stitching trim cover pieces together is provided at place where the adhesive sheet for molding the recessed configuration is applied, and the adhesive sheet is sewn to a seam allowance of this edge-stitch portion. In this method, the edge-stitch portion may be located at a corner part such that the corner part may serve as a rough indication of the position where the press die is pressed in.

While the above description is made on the seat back of the vehicle seat, it is apparent that the invention can be applied to a vehicle seat other than the seat back to form the recessed configuration. Specifically, the invention can be applied as a recessed configuration molding method for overall vehicle seat by replacing the seat back, seat back frame, seat back pad and seat back pad groove of the above description with a seat, seat frame, seat pad and seat pad groove.

As described above, this embodiment pertains to the recessed configuration molding method for the vehicle seat including the seat frame, the seat pad covering the seat frame, and the trim cover covering the seat pad. The seat pad includes the seat pad groove. The adhesive sheet is sewn to an underside of the trim cover with the outer stitch. After the seat pad is covered with the trim cover, the trim cover is made to adhere to the seat pad groove by pressing the press die against the outer stitch from an outside surface of the trim cover so that the recessed configuration is formed.

Alternatively, the adhesive sheet is sewn to the seam allowance of the edge-stitch portion of the trim cover. The seat pad is covered with the trim cover and thereafter, the recessed configuration is formed by making the trim cover adhere to the seat pad groove by pressing the press die against the edge-stitch portion from the outside surface of the trim cover.

The embodiment further pertains to the vehicle seat which includes: the seat frame; the seat pad covering the seat frame; and the trim cover covering the seat pad, and which has the structure in which the seat pad includes the seat pad groove, the trim cover includes the outer stitch or the seam allowance of the edge-stitch portion, and the outer stitch or the seam allowance of the edge-stitch portion is made to adhere to the seat pad groove so that the recessed configuration is formed.

Thus, the embodiment negates the need for the suspension process and also negates the need for the step of rolling up the trim cover because the trim cover is made to adhere to the seat pad after the trim cover is put over the seat pad. This negates the need for the fastener which is required by the prior art. Further, the suspension-related members become unnecessary so that the embodiment can provide the vehicle seat and the vehicle seat molding method used therefor which are effective in reducing the costs.

Second Embodiment

In the first embodiment, the description is made on the case of molding the recessed configuration of the seat back based on the assumption that the seat back of a front seat of a vehicle includes the recessed configuration on the back side thereof.

In this embodiment, description is made on a case where the recessed configuration is formed at a part other than the seat back.

Figure 3:
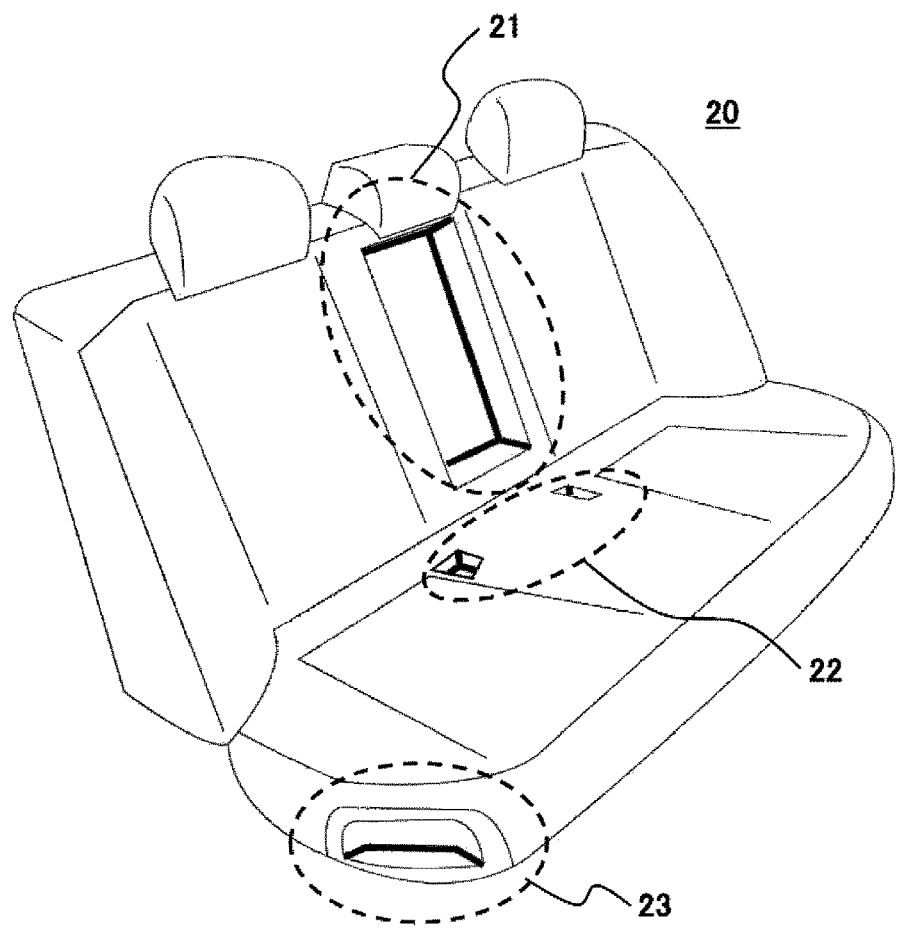
FIG. 3 is an external view of a vehicle seat according to a second embodiment hereof.

FIG. 3 is an external view of a vehicle seat according to this embodiment. FIG. 3 illustrates a vehicular rear seat 20, showing an area to which the recessed configuration molding method described in the first embodiment is applicable. Referring to FIG. 3, an armrest storage part 21 is an enclosed boxlike concave portion. The method of the first embodiment can be applied to the formation of the concave sides of the concave portion. To form the concave portion, the outer stitch is formed by linearly sewing the adhesive sheet to an underside of a corner part as a stitching portion of the trim cover. After the trim cover is put over the seat pad, the trim cover is made to adhere to the seat pad groove by pressing the press die against the outer stitch so that the concave portion is formed. In this case, the outer stitch consists of eight sides (including sides not shown in the figure) indicated by the bold lines of the boxlike concave portion, or eight linear adhesion portions. Incidentally, the adhesion of the trim cover is not limited to the eight sides, but the trim cover may linearly adhere to the seat pad groove only on four sides of a bottom of the boxlike concave portion.

A seatbelt buckle storage part 22 has its concave portion formed the same way as that of the armrest storage part. Namely, the outer stitch is formed by linearly sewing the adhesive sheet to the underside of the corner part as the stitching portion of the trim cover. After the trim cover is put over the seat pad, the trim cover is made to adhere to the seat pad by pressing the press die against the outer stitch so that the concave portion is formed.

A foot passing space 23 on a seat side surface is also a concave portion for providing both a large area of a seating surface and a large foot passing space for a passenger getting on or off a vehicle. Just as the formation of the armrest storage part, this concave portion can be formed by: molding the outer stitch at the corner part of the concave portion; covering the seat pad with the trim cover having the adhesive sheet sewn thereto; and making the trim cover adhere to the seat pad by pressing the press die against the outer stitch so as to form the concave portion.

In this embodiment as well, the following method may be taken instead of sewing the adhesive sheet to the trim cover with the outer stitch. That is, an edge-stitch portion for stitching trim cover pieces together is formed at place where the adhesive sheet for molding the recessed configuration is applied, and the adhesive sheet is sewn to the seam allowance of this edge-stitch portion.

As just described, this embodiment is also applicable to the formation of the recessed configuration of the part other than the seat back, or is adapted to form the concave portion by making only the required part of the trim cover adhere to the seat pad after the seat pad is covered with the trim cover. Therefore, the embodiment simplifies the process of molding the recessed configuration. Furthermore, the embodiment can provide the vehicle seat which features a small parts count and is effective in cost reduction, and the vehicle seat molding method used therefor.

While this embodiment illustrates the rear seat, the embodiment offers the same effects on the other seats.

While the foregoing embodiments have been described, the invention is not limited to the above embodiments and includes a variety of modifications. The above embodiments are specifically described for the sake of clarity of the invention but the invention is not limited to those including all the components described. Further, some of the components of one embodiment can be replaced with other components.

REFERENCE SIGNS LIST

1, 101: seat back
2, 104: trim cover
3: outer stitch
4, 102: seat back frame
5, 103: seat back pad
6: seat back pad groove
7: adhesive sheet
8, 111: trim end fastener
9: press die
20: vehicular rear seat
21: armrest storage part
22: seatbelt buckle storage part
23: foot passing space on seat side surface
105: suspension purse
106: suspension core wire
107: hook ring
108: edge-stitch line
109: fastener
110: suspension wire

The invention claimed is:

1. A recessed configuration molding method for a back side of a seat back including: a seat back frame; a seat back pad covering the seat back frame; and a trim cover covering the seat back pad, wherein
   the seat back pad includes a seat back pad groove at an area defining a deepest portion of a recessed face produced on a back side of the seat back pad,
   an adhesive sheet is sewn to an underside of the trim cover with an outer stitch,
   the seat back pad is covered with the trim cover so that the adhesive sheet is aligned with the seat back pad groove and then,
   the recessed configuration is formed by making the trim cover linearly adhere to the seat back pad groove by pressing a press die against the outer stitch from an outside surface of the trim cover and melting the adhesive sheet by heating a distal end of the press die or ejecting steam from the distal end thereof.

2. A vehicle seat back comprising:
   a seat back frame;
   a seat back pad covering the seat back frame; and
   a trim cover covering the seat back pad, wherein
   the seat back pad is formed with a recessed face in a back side of the seat back pad, and includes a seat back pad groove at an area defining a deepest portion of the recessed face produced on a back side of the seat back pad,
   the trim cover includes an outer stitch and an underside of the trim cover corresponding to a portion of the outer stitch linearly adheres to the seat back pad groove, and
   the trim cover has a recessed configuration on a back side of the vehicle seat back.

3. A vehicle seat comprising:
   a seat frame;
   a seat pad covering the seat frame; and
   a trim cover covering the seat pad, wherein
   the seat pad includes a seat pad groove,
   the trim cover includes an outer stitch or a seam allowance of an edge-stitch portion,
   has a recessed configuration with the outer stitch or the seam allowance of the edge-stitch portion thereof adherent to the seat pad groove, and
   the recessed configuration is an armrest storage part.

4. A vehicle seat comprising:
   a seat frame;
   a seat pad covering the seat frame; and
   a trim cover covering the seat pad, wherein
   the seat pad includes a seat pad groove, the trim cover includes an outer stitch or a seam allowance of an edge-stitch portion, has a recessed configuration with the outer stitch or the seam allowance of the edge-stitch portion thereof adherent to the seat pad groove, and the recessed configuration is a seatbelt buckle storage part.

5. A vehicle seat comprising:

a seat frame;

a seat pad covering the seat frame; and a trim cover covering the seat pad, wherein the seat pad includes a seat pad groove, the trim cover includes an outer stitch or a seam allowance of an edge-stitch portion, has a recessed configuration with the outer stitch or the seam allowance of the edge-stitch portion thereof adherent to the seat pad groove, and the recessed configuration is a foot passing space on a seat side surface.

\* \* \* \* \*